United States Patent [19]

Okita et al.

[11] Patent Number: 4,468,436

[45] Date of Patent: Aug. 28, 1984

[54] MAGNETIC RECORDING MATERIAL

[75] Inventors: Tsutomu Okita; Kiritani Masataka, both of Shizuoka, Japan

[73] Assignee: Fuji Photo Film Co., Ltd., Kanagawa, Japan

[21] Appl. No.: 452,555

[22] Filed: Dec. 23, 1982

[51] Int. Cl.$^3$ .............................................. B05D 3/06
[52] U.S. Cl. .................... 428/423.3; 360/131; 360/134; 427/44; 427/131; 428/425.9; 428/520; 428/900
[58] Field of Search ............... 427/44, 54.1, 128, 130, 427/131; 428/900, 423.3, 425.9, 520; 360/131, 134, 135

[56] References Cited

U.S. PATENT DOCUMENTS

| | | | |
|---|---|---|---|
| 3,310,421 | 3/1967 | Flowers | 428/900 |
| 4,313,989 | 2/1982 | Suzuki et al. | 428/900 |
| 4,335,183 | 6/1982 | Hosaka | 427/128 |
| 4,343,831 | 8/1982 | Tsuji | 427/128 |

Primary Examiner—John H. Newsome
Attorney, Agent, or Firm—Sughrue, Mion, Zinn, Macpeak, and Seas

[57] ABSTRACT

A magnetic recording material and a process for producing it are disclosed. The material is excellent in abrasion resistance and has good electric characteristics. The material is obtained by coating on a support a subbing layer having a compound which contains a compound having an unsaturated bond polymerizable upon irradiation with electron beams. Upon the subbing layer is coated a ferromagnetic layer which contains a compound having an unsaturated bond polymerizable upon irradiation with electron beams, an organic solvent capable of dissolving the compound, and a ferromagnetic fine powder. The material is then subjected to an electron-beam irradiating processing to result in the hardening of the subbing and ferromagnetic layers through polymerization.

15 Claims, No Drawings

MAGNETIC RECORDING MATERIAL

FIELD OF THE INVENTION

This invention relates to a magnetic recording material and, more particularly, to a magnetic recording material having excellent abrasion resistance and good electric characteristics.

BACKGROUND OF THE INVENTION

In most magnetic recording materials presently used, thermoplastic resins, such as vinyl chloride-vinyl acetate copolymer resins, vinyl chloride-vinylidene chloride copolymer resins, cellulose resins, acetal resins, urethane resins, acrylonitrile-butadiene resins and the like, are used as binders independently or in combination of two or more thereof. However, these materials suffer from the defect that when used for a magnetic tape parts of the magnetic layer may be removed and contaminate the running passage of the magnetic tape such as guide posts, magnetic heads, cylinders, etc. due to inferior abrasion resistances of their magnetic layers.

In addition to the above materials, thermosetting resins such as melamine resins, urea resins and the like, or chemically cross-linkable binders obtained by adding cross-linking agents, such as isocyanate compounds, epoxy compounds and the like, have also been used as binders for magnetic tapes. However, the use of cross-linkable binders causes two serious disadvantages: (1) a resinous solution in which a magnetic substance has been dispersed has a low storage stability, that is, a short pot life, and, therefore, the homogeneity of the physical properties of the magnetic coating composition cannot be maintained which, in turn, deteriorates the uniformity of the magnetic tape; and (2) after coating and drying the magnetic coating composition, the coated composition must be subjected to heat treatment for hardening the coated layer whereby the process requires a prolonged time to obtain the final magnetic recording materials.

With the intention of obviating the above-described disadvantages, methods of producing magnetic materials in which mixtures of the oligomers and the monomers of acrylic acid ester type are used as binders, and their magnetic layers are hardened by irradiation with electron beams are disclosed in Japanese Patent Publication No. 12423/72; Japanese Patent Application (OPI) Nos. 15104/72 (French Pat. No. 2,120,184 and German Pat. Nos. 2,100,037), 77433/75 and 25235/81, etc; and U.S. Pat. Nos. 3,104,983 and 4,004,997. These prior art references disclose the use of magnetic recording composition hardenable by irradiation with electron beams, but do not teach a subbing layer or surface treatment of supports on which the magnetic recording layer is provided. These conventional magnetic recording materials have, therefore, disadvantages that the magnetic recording layer tends to be peeled off during repeated use due to insufficient adhesion between the magnetic recording layer and the support.

In recent years, a demand for long time recording and light-weight magnetic tapes has increased. In order to meet this demand, it is indispensable to use a thin support. Further, the magnetic recording material must be usable under conditions which are much more severe than before because recent record-reproducing apparatuses, such as video tape recorder, audio tape recorder, etc., have various functions. According to conventional methods using a hardening reaction caused by irradiation with electron beams, magnetic tapes obtained create various troubles, for example, the magnetic tape may be broken during the running operation, the magnetic layer may peel off in a recorder and contaminate the running course of the magnetic tape, or the magnetic layer may peel off during a smoothening procedure using a calender. Therefore, magnetic recording materials having excellent properties have not yet been obtained.

As a result of various studies with the intention of solving the above-described problems making the most of advantages of an electron-beam hardenable binder, the present inventors completed the present invention.

SUMMARY OF THE INVENTION

A first object of this invention is to provide a magnetic recording material having excellent abrasion resistance.

A second object of this invention is to provide a magnetic recording material which does not cause a peeling-off phenomenon of its magnetic layer in a recorder.

A third object of this invention is to provide a magnetic recording material which does not cause a peeling-off phenomenon of its magnetic layer in the course of a smoothening procedure for the magnetic layer.

A fourth object of this invention is to provide a magnetic recording material having good electromagnetic characteristics.

A fifth object of this invention is to provide a magnetic recording material to which uniformity is imparted by using a magnetic coating composition having an excellent storage stability.

A sixth object of this invention is to provide a magnetic recording material which does not require a heat processing step for hardening a magnetic layer thereof.

The above-described objects are attained with a magnetic recording material which is produced by coating on a support having a subbing layer a composition containing a compound having an unsaturated bond polymerizable by electron-beam irradiation, a ferromagnetic fine power and an organic solvent capable of dissolving the above-described compound therein, and then irradiating the coated composition with electron beams to cause polymerization hardening of the composition.

DETAILED DESCRIPTION OF THE INVENTION

A subbing layer which can be employed in this invention can be formed from any materials conventionally used for subbing layers, which will be illustrated in detail hereinafter. The subbing layer used in the present invention is effective for preventing the decrease in adhesive force between the magnetic recording layer and the support. Such decrease in adhesive force appears to be caused by stress generated in the magnetic layer due to volume reduction upon polymerization of the compound polymerizable by electron-beam irradiation. In particular, when a subbing layer having carbon-carbon unsaturated bonds is provided, a strong adhesion can be obtained between the magnetic layer and support. Accordingly, the defects attended by the use of conventional electron-beam hardenable binders can be eliminated, and contamination of the running passages of tapes with the magnetic layer and contamination of calender rolls during the smoothening procedure of the magnetic layer can be prevented. In addition, since the fear of contaminating calender rolls with magnetic layers is excluded, a smoothening processing under much higher pressure becomes feasible and whereby smoothness of the magnetic layer surface is improved to result in sharp increases in the electromagnetic characteristics. It can be presumed that a strong adhesiveness between the magnetic layer and the support is brought about by tight primary bonding formed between the subbing layer and the magnetic layer through the activation of the subbing layer, which is chemically innactive in nature, by irradiation with electron beams. Moreover, in the above-described case, hardening of the subbing layer and that of the magnetic layer are carried out at the same time and, therefore, the use of the subbing layer of the above type is of greater advantage than those of other subbing layers from the standpoint of process steps.

Examples of compounds having unsaturated bonds polymerizable by irradiation with electron beams include those preferably having a plurality of vinyl or vinylidene carbon-carbon double bonds, more specifically compounds having acryloyl groups, acrylamido groups, allyl groups, vinyl ether groups, vinyl thioether groups, etc., and unsaturated polyesters.

Particularly advantageous compounds are those which have acryloyl groups or methacryloyl groups at both ends of their individual straight chain molecules, and they are cited in A. Vrancken, *Fatipec Congress*, 1119 (1972); U.S. Pat. No. 3,530,100; and British Pat. Nos. 1,234,684, 1,162,721, 1,162,722, 1,162,723 and 1,162,724. For example, such compounds are represented by the following structural formula:

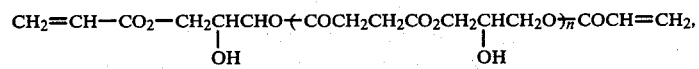

and the polyester skeleton of the above-illustrated compounds may be replaced by a polyurethane skeleton, an epoxy resin skeleton, a polyether skeleton, a polycarbonate skeleton or a combination of two or more of these skeletons. In addition, both ends of the above-illustrated compound may be methacryloyl group instead of acryloyl group. The molecular weight and the viscosity of these compounds are not critical in the present invention, but compounds having a viscosity of about 1 to about 1,000,000 cps at 50° C. and a molecular weight in the range of from about 1,000 to about 20,000, preferably 2,000 to 15,000, can be advantageously used.

In addition to the above-described compounds, monomers having an unsaturated carbon-carbon bond in the molecule and having a molecular weight of about 100 to about 500 can be added to the magnetic coating composition. Specific examples of such monomers include acrylic acid, methacrylic acid, itaconic acid, methyl acrylate and its analogues (i.e., acrylic acid alkyl esters), methyl methacrylate and its analogues (i.e., methacrylic acid alkyl esters), styrene and its analogues (i.e., α-methylstyrene, β-methylstyrene, etc.), acrylonitrile, methacrylonitrile, acrylamide, methacrylamine, vinyl acetate, vinyl propionate and the like. Also, monomers having two or more of unsaturated bonds in the molecule may be added to the composition. Examples of such monomers include compounds described in *Kankosei Jushi Data Shu* (Collection of Data on Photosensitive Resins), pp. 235–236, KK. Sogo Kagaku Kenkyusho (Dec. 1968); U.S. Pat. Nos. 2,760,863, 2,791,504 and 2,927,023; and British Pat. Nos. 834,733 and 854,980. In particular, unsaturated esters of polyols, such as ethylene diacrylate, diethylene glycol discrylate, glycerol trimethacrylate, ethylene dimethacrylate, pentaerythrithol tetramethacrylate and the like, and glycidyl methacrylates having epoxy rings are preferably used. Further, compounds having one unsaturated bond in the molecule and compounds having two or more unsaturated bonds in the molecule may be used as a mixture thereof.

When the above monomer is added, a preferable ratio of the polymer to the monomer is 2/8 or above. If the monomer is used in an amount more than 80% by weight of the total monomer/polymer composition, a large amount of energy is required for hardening the coating composition. Furthermore, thermoplastic resins such as vinyl chloride-vinyl acetate copolymers, cellulose resins, butyral resins, polyurethane resins, butane resins and the like may be added, provided that an addition amount of thermoplastic resins is smaller than three times the total amount of electron-beam hardenable compounds used. If the amount of thermoplastic resins is increased beyond the above-described limit, the thermoplastic resins deteriorate the abrasion resistance of the magnetic layer.

Example of ferromagnetic powders which can be used in this invention include ferromagnetic iron oxide powder, ferromagnetic chromium dioxide powder, ferromagnetic alloy powder and the like. The ferromagnetic iron oxide and the ferromagnetic chromium dioxide particles which can be used in this invention have an axial ratio ranging from about 2:1 to about 20:1, preferably 5:1 or more, and an average length in the range of about 0.2 to about 2.0 μm. The above ferromagnetic alloy powder contains about 75 wt% or more of metal component, with 80 wt% or more of the metal component being one or more ferromagnetic metals (e.g., Fe, Co, Ni, Fe-Co, Fe-Ni, Co-Ni, Fe-Co-Ni, etc.), and contains particles having a length of about 1.0 μm or shorter.

The organic solvent used in this invention can be properly selected from a wide variety of solvents so long as they dissolve the compounds polymerizable by irradiation with electron beams. It is one of the advantages of the present invention that various types of solvents can be used since the compounds polymerizable by electron beams have relatively low molecular weight. Examples of solvents are ketones such as acetone, methyl ethyl ketone, methyl isobutyl ketone, cyclohexanone, etc.; esters such as methyl acetate, ethyl acetate, butyl acetate, ethyl lactate, glycol acetate monoethyl ether, etc.; ethers such as ethyl ether, glycol dimethyl ether, glycol monoethyl ether, dioxane, etc.; aromatic hydrocarbons such as benzene, toluene, xylene, etc.; chlorinated hydrocarbons such as methylene chloride, ethylene chloride, carbon tetrachloride, chloroform, ethylene chlorohydrin, dichlorobenzene, etc.; and the like.

In the coating composition of this invention, a suitable weight ratio of the polymer (based on the total weight of the polymer and the monomer when the monomer is used in combination) to the weight of the ferromagnetic powder ranges from 2:1 to 1:20, preferably from 1:1 to 1:10, more preferably 1:3 to 1:8. If the ratio deviates from the above range, a marked deterioration of electric characteristics or a sharp decrease in abrasion resistance occurs.

In addition to the above-described components, various additives such as a lubricant, a dispersing agent, an abrasive, a rust preventive agent, an antistatic agent and the like may be included in the coating composition of this invention. Suitable examples of the lubricant include saturated and unsaturated higher fatty acids, fatty acid esters, higher fatty acid amides, higher alcohols, silicone oils, mineral oils, vegetable oils, fluorine compounds and the like, preferably higher fatty acids, higher fatty acid esters and silicone oils. Such lubricants may be added at the time of preparing the coating composition, or may be coated or sprayed onto the surface of a magnetic layer in the form of a solution thereof dissolved in an organic solvent or in its neat state after the drying step, smoothening step or hardening step by electron beam irradiation. The lubricant can be preferably added in an amount of 0.1 to 3% by weight, more preferably 0.2 to 2% by weight, based on the weight of magnetic material.

In preparing a magnetic coating composition, the ferromagnetic powder and individual components described above are charged into a kneader all at once or in sequence. In this step, the dispersing agent may be added together with the ferromagnetic powder.

Suitable examples of materials which can be used as the above-described support include polyesters such as polyethylene terephthalate, polyethylene 2,6-naphthalate, etc.; polyolefins such as polyethylene, polypropylene, etc.; cellulose derivatives such as cellulose triacetate, cellulose diacetate, cellulose acetate butyrate, cellulose acetate propionate, etc.; vinyl resins such as polyvinyl chloride, polyvinylidene chloride, etc.; and other plastics such as polycarbonate, polyimide, polyamide-imide, etc. Particularly preferred examples of supports are polyesters, polyimides and polyamide-imides such as polyethylene terephthalate, polyethylene 2,6-naphthalate and the like.

Suitable examples of materials which can constitute the subbing layer of this invention include halogen-containing synthetic resins such as polyvinyl chloride, polyvinyl bromide, polyvinyl fluoride, polyvinylidene chloride, chlorinated polyethylene, chlorinated polypropylene, brominated polyethylene, chlorinated rubber, vinyl chloride-ethylene copolymer, vinyl chloride-propylene copolymer, vinyl chloride-styrene copolymer, vinyl chloride-isobutylene copolymer, vinyl chloride-vinylidene chloride copolymer, vinyl chloride-styrene-maleic anhydride terpolymer; vinyl chloride-styrene-acrylonitrile terpolymer, vinyl chloride-butadiene copolymer, vinyl chloride-isoprene copolymer, vinyl chloride-chlorinated propylene copolymer, vinyl chloride-vinylidene chloride-vinyl acetate terpolymer, vinyl chloride-acrylic acid ester copolymers, vinyl chloride-maleic acid ester copolymers, vinyl chloride-methacrylic acid ester copolymers, vinyl chloride-acrylonitrile copolymer, internally plasticized polyvinyl chloride, vinyl chloride-vinyl acetate copolymer, vinylidene chloride-methacrylic acid ester copolymers, vinylidene chloride-acrylonitrile copolymer, vinylidene chloride-acrylic acid ester copolymers, chloroethyl vinyl ether-acrylic acid ester copolymers, polyvinylidene fluoride and the like; polyolefins such as polyethylene, polypropylene, polybutene, α-olefin copolymers like poly-3-methylbutene, ethylene-propylene-1,4-hexadiene copolymer, ethylene-vinyl acetate copolymer, copolybutene-1-propylene, butadiene-acrylonitrile copolymer, etc., and blends of these copolymers with halogen-containing resins; acryl resins such as acrylic acid ester-acrylonitrile copolymer, acrylic acid ester-styrene copolymer, methacrylic acid ester-acrylonitrile copolymer, methacrylic acid ester-styrene copolymer, polyalkyl acrylates, acrylic acid-butylacrylate copolymer, acrylic acid ester-butadiene-styrene copolymers, methacrylic acid ester-butadiene-styrene copolymers, or methyl methacrylate/ethyl acrylate/2-hydroxyethyl acrylate/methacrylic acid copolymer having a copolymerization ratio of 67/23/7/3 by weight, methyl methacrylate/ethyl acrylate/2-hydroxyethyl acrylate/methacrylic acid copolymer having a copolymerization ratio of 72/17/7/3 by weight, methyl methacrylate/ethyl acrylate/2-hydroxyethyl acrylate/methacrylic acid copolymer having a copolymerization ratio of 70/20/7/3 and methyl methacrylate/butyl acrylate/2-hydroxyethyl acrylate/methacrylic acid copolymer having a copolymerization ratio of 70/20/7/3 by weight; styrene resins such as polystyrene, copolymers of styrene and other monomers (e.g., maleic anhydride, butadiene, acrylonitrile, etc.), acrylonitrile-butadiene-styrene copolymer, etc.; polyacetal resins, polyvinyl alcohol, and blends, block copolymers or graft copolymers of these resins; and other resins, e.g., polyamide resin, polyvinyl butyral, cellulose derivatives, polyester resin, vinyl polymers such as polyvinyl alcohol, condensation polymers such as polycarbonate, polyether and the like, rubbers such as natural rubber, butyl rubber, neoprene rubber, styrene-butadiene copolymer rubber, silicone rubber, polyurethane, synthetic rubber, etc., polyamides, urethane elastomer, nylon-silicone resins, nitrocellulosepolyamide resin, and the like. The above-described acryl resins, methacryl resins, polyolefins, polyamides, polyesters, polyurethanes, polycarbonates, rubbers and cellulose resins, or blends, block copolymers and graft copolymers of two or more of resins set forth above may be used as a mixture thereof. Water may be used as the solvent for forming the subbing layer. In addition, organic solvents or mixtures of water with organic solvents may be used, as the case may be.

Examples of preferred materials which can be used to greater advantage in forming the subbing layer of this invention include compounds having carbon-carbon unsaturated bonds, such as acrylonitrile-butadiene copolymer, vinylidene chloride-butadiene copolymers, acrylic acid ester-butadienestyrene copolymers, vinyl chloride-isoprene copolymer, and compounds produced by acryloylating oligomers of polyurethane, polyesters, polyethers and the like. Particularly preferred compounds are budadiene/acrylonitrile copolymers, vinylidene chloride copolymers such as vinylidene chloride/acrylonitrile compolymers, polyester resins and polyurethane acrylates. A suitable thickness of the subbing layer is 0.5 to 1.0μ, preferably 0.1 to 0.5μ.

Processes for coating the subbing layer on a support on a magnetic recording layer on the subbing layer which can be applied to this invention include an air doctor coating process, a blade coating process, an air knife coating process, a squeeze-coating process, an immerse-coating process, a reverse roll coating process, a transfer roll coating process, a gravure coating process, a kiss coating process, a cast coating process, a spray coating process, a spin coating process, a bar coating process and the like, but other suitable processes which are known to the art can also be employed. Specific detailed descriptions of suitable coating techniques are given in *Coating Engineering*, pp. 253–277, Asakura Shoten, Tokyo Mar. 20, 1971).

The magnetic composition is coated as a layer having a dry thickness of about 0.5 to about 15 μm. The dry thickness is properly determined depending upon the end-use purpose, the form and the standard of the magnetic material to be produced.

The magnetic layer coated on the subbing layer using one of the above-described coating processes is, if necessary, subjected to orientation of the ferromagnetic powder in the layer as described below in detail and the thus formed magnetic layer is then dried.

Orientation of the ferromagnetic powder in the magnetic layer can be carried out under the following conditions: The magnetic field for the orientation of the ferromagnetic powder orientation can be about 500 to about 2,000 oersted (either a DC or an AC magnetic field). The direction of orienting the ferromagnetic powder is determined depending upon the end-use purpose of the magnetic material to be produced. That is, for the audio tapes, small-sized video tapes, memory tapes and the like, the orientation direction is parallel to the longitudinal direction of the tape, whereas in the case of video tapes for broadcasting, the orientation is inclined at an angle of 30° to 90° with respect to the longitudinal direction of the tape.

After the orientation, the magnetic layer is then air-dried. A suitable drying temperature for the magnetic layer is about 50° to about 120° C., preferably 70° to 100° C., more preferably 80° to 90° C., using an air flow rate of about 1 to about 5 Kl/m$^2$, preferably 2 to 3 Kl/m$^2$, with a drying time of about 30 seconds to about 10 minutes, preferably 1 to 5 minutes.

Before the drying processing, the smoothening processing of the surface of the magnetic layer may be carried out. The process for smoothening the magnetic layer surface can be performed using a magnet smoother, a smoothening coil, a smoothening blade, a smoothening blancket, etc. as the case may be.

On the side opposite to the magnetic layer, the support of this invention may be back-coated (i.e., coated with a backing layer) for the purposes of preventing generation of static charges, print through and wow-flutter, improving upon mechanical strength of the magnetic material, matting the back face of the magnetic material, etc.

A suitable thickness of the non-magnetic support is about 1 to about 50 μm, particularly 2 to 25 μm, in a form of film, tape or sheet. When the support is in a form of disc or card, a suitable thickness thereof is about 0.5 to 2 mm, whereas when the support is in a shape of drum, it is rendered cylindrical, the form of which is determined by the recorder to be used.

The smoothening process for the dried surface of the magnetic layer is then conducted using a calendering process comprising passing the magnetic recording material between a specular roll and a specular roll, or a calendering process comprising passing the magnetic recording material between a specular roll and an elastic roll.

A suitable specular roll which can be used for the calendering process is a metal roll, and a suitable elastic roll for such a purpose is a cotton roll or a synthetic resin (e.g., nylon, polyurethane, etc.) roll.

Suitable conditions for the calendering process are a roll pressure of about 25 to about 100 Kg/cm$^2$ (a linear pressure of 80 to 320 Kg/cm), a temperature of about 10° to about 150° C., more particularly 30° to 100° C., a processing rate of 5 to 200 m/min, and a processing step number of 1 to 30. If the temperature and the pressure exceed the upper limits set forth above, the magnetic layer and the support are detrimentally influenced, for example, the magnetic layer is peeled off, and the support is deformed. If the processing rate is less than about 5 m/min, a surface-smoothening effect can not be obtained, whereas if the rate is more than about 200 m/min, the processing procedure become difficult. The smoothening processing may be carried out before or after the electron-beam irradiation processing. Preferably, the procedure of electron-beam irradiation is carried out by installments. For example, it is advantageous to carry out the electron beam irradiation for one or more times before and after the smoothening processing respectively.

Suitable examples of electron-beam accelerators which can be adopted in this invention include those of the Van de Graaff type scanning system, double scanning system and curtain beam system. In these electron-beam accelerators, those of the curtain beam system are used to advantage because of their comparatively low prices and high power output. Desirable electron beam characteristics can be obtained when an accelerating voltage is 100 to 1,000 KV, more particularly 150 to 300 KV, and a suitable absorption dose is 0.5 to 20 megarad, preferably 2 to 10 megarad. If the accelerating voltage is less than 100 KV, the energy of the electron beam is too low to permeate into the magnetic layer, whereas if it exceeds 1,000 KV, the efficiency of energy to be used for polymerization is decreased, that is to say, economical efficiency is lowered. If the absorption dose is less than 0.5 megarad, the hardening reaction is incomplete and sufficient strength can not be imparted to the magnetic layer, whereas if the absorption dose is more than 20 megarad, the efficiency of energy to be used for hardening is lowered and further, an exothermic reaction occurs in the irradiated material to result in the deformation of the support, especially a plastic one. The irradiation with electron beams may be conducted before the evaporation of the organic solvent from the coated layer, or after such an evaporation procedure. Further, the irradiation with electron beams may be conducted before and/or after the smoothening process using the calendering process. More specifically, it is preferred to conduct the irradiation with electron beam either after the calender roll smoothening process, or once before the calender roll smoothening process and again after the calender roll smoothening process.

This invention will now be illustrated in greater detail by reference to the following examples and comparative example, but this invention is not limited to these examples. In these examples, all parts are by weight unless otherwise indicated.

EXAMPLE 1

Four parts of the emulsion polymerization product disclosed in Example 2 of Japanese Patent Application (OPI) No. 114120/76 (butadiene/acrylonitrile/methacrylic acid copolymer) was dispersed in 100 parts of distilled water, coated on a 15 μm-thick polyethylene terephthalate film in an amount of 20 ml/m$^2$, and dried at 120° C. for 10 minutes.

| Magnetic Coating Composition: | |
|---|---|
| γ-Fe$_2$O$_3$ | 100 parts |
| Urethane Type Acrylate Oligomer | 20 parts |

-continued

| Magnetic Coating Composition: | |
| --- | --- |
| (Prepared in the same manner as described in Example 1 of U.S. Pat. No. 4,092,173) | |
| Diethylene Glycol Diacrylate | 10 parts |
| Methyl Ethyl Ketone | 250 parts |
| Stearic Acid | 1 part |
| Butyl Stearate | 1 part |

The above magnetic coating composition was placed in a ball mill and kneaded for 50 hours. The thus obtained magnetic coating composition was coated on the above-described polyethylene terephthalate film having the subbing layer in a dry thickness of 6 μm using a doctor blade, oriented using a cobalt magnet, and dried to remove the solvent therefrom (for 1 minute at 100° C.). Then, it was subjected to the smoothening processing using a 5-step calender comprising a group of cotton rolls and specular rolls (with a roll temperature of 40° C. under a roll pressure of 100 Kg/cm$^2$). Thereafter, it was irradiated with electron beams under the condition that an accelerating voltage was 220 KV, a beam current was 10 mA, and an absorption dose was 5 megarad as determined using a dose measuring film (Radiochromic Film made by Far West Technology Inc.) The thus obtained magnetic recording material was identified as Sample No. 1.

EXAMPLE 2

A magnetic recording material was prepared in the same manner as described in Example 1 except that a 5% methyl ethyl ketone solution of urethane acrylate oligomer (trade name X-1000, made by Toa Gosei Chemical Industry Co., Ltd.) was used instead of the above-described dispersion for the subbing layer. This material was identified as Sample No. 2.

EXAMPLE 3

A magnetic recording material was prepared in the same manner as described in Example 1 except that the emulsion disclosed in Example 1 of Japanese Patent Application (OPI) No. 58469/76 (a 2% solution of styrene/n-butyl acrylate/glycidyl acrylate copolymer) was used instead of the above-described dispersion for the subbing layer. The magnetic tape obtained was identified as Sample No. 3.

EXAMPLE 4

A magnetic recording material was prepared in the same manner as described in Example 1 except that a 4% aqueous solution of the latex disclosed in Synthesis Example 1 of Japanese Patent Application (OPI) No. 135526/76 (a vinylidene chloride/methyl acrylate/hydroxyethyl acrylate copolymer) was used instead of the above-described dispersion for the subbing layer. The magnetic tape obtained was identified as Sample No. 4.

EXAMPLE 5

A magnetic recording material was prepared in the same manner as described in Example 1 except that a 5% methyl ethyl ketone solution of vinylidene chloride-acrylonitrile copolymer (trade name Saran Resin F-120, made by Dow Chemical Co.) was used instead of the above-described dispersion for the subbing layer. The magnetic tape obtained was identified as Sample No. 5.

EXAMPLE 6

A magnetic recording material was prepared in the same manner as described in Example 1 except that a polyester resin (an ethylene glycol/isophthalic acid/terephthalic acid copolymer having a molar ratio of about 8:2:1) was used instead of the above-described dispersion for the subbing layer. The magnetic tape obtained was identified as Sample No. 6.

COMPARATIVE EXAMPLE

A magnetic recording material was prepared in the same manner as described in Example 1 except that no subbing layer was provided. The magnetic tape obtained was identified as Sample No. 7.

Each of the thus obtained magnetic tapes was repeatedly run 100 times in a home video tape recorder (trade name MACLORD 88, made by Matsushita Electric Industrial Co., Ltd.). The results obtained after the running test are shown in Table, together with the conditions after calender processing prior to the running test.

TABLE

| Sample No. | Conditions After Calendering | Result of Running Test |
| --- | --- | --- |
| 1 | Normal | Normal |
| 2 | Normal | Normal |
| 3 | Normal | Normal |
| 4 | Normal | Normal |
| 5 | Normal | Normal |
| 6 | Normal | Normal |
| 7 | Part of magnetic layer was transferred on calender rolls. | Running passages were contaminated with powder peeled away from magnetic layer. |

As is apparent from the results shown in Table, Sample Nos. 1 to 6 according to the present invention can be subjected to the smoothening processing using calender rolls without transfer of magnetic layer to the calender rolls, and the resulting magnetic recording tapes do not contaminate running passage such as magnetic heads, guide posts, cylinder, etc. after repeated running. Thus, the tapes are practically useful without any decrease of signal output or drop-out due to contamination of passages by peeled-off magnetic layer. On the other hand, Sample No. 7 having no subbing layer shows peeling-off of the magnetic layer during calender processing and running test.

While the invention has been described in detail and with reference to specific embodiments thereof, it will be apparent to one skilled in the art that various changes and modifications can be made therein without departing from the spirit and scope thereof.

What is claimed is:

1. A magnetic recording material produced by a process comprising the steps of:
    providing a subbing layer on a surface of a support base, the subbing layer comprising a compound having an unsaturated bond polymerizable upon irradiation with electron beams;
    coating a composition on the subbing layer, the composition comprising (a) a compound having an unsaturated bond polymerizable upon irradiation with electron beams, (b) an organic solvent capable of dissolving the compound, and (c) a ferromagnetic powder;

irradiating the subbing layer and coated composition with sufficient electron beam irradiation to cause polymerization and hardening of the subbing layer compound and the compound (a) containing the ferromagnetic powder (c).

2. A magnetic recording material produced by the process as claimed in claim 1, wherein the compound (a) having an unsaturated bond polymerizable upon irradiation, and containing the ferromagnetic powder (c), is polyurethane acrylate.

3. A magnetic recording material produced by the process as claimed in claim 1, wherein the subbing layer compound having an unsaturated bond polymerizable upon irradiation with electron beams is selected from the group consisting of an acrylonitrile-butadiene copolymer, a polyurethaneacrylate oligomer, a polyesteracrylate oligomer and a polyetheracrylate oligomer.

4. A magnetic recording material produced by the process as claimed in claim 1, wherein the irradiating is carried out with electron-beam irradiation with an accelerating voltage of 100 to 1,000 KV to provide an absorption dose of 0.5 to 20 megarad.

5. A magnetic recording material produced by the process as claimed in claim 1, wherein the compounds having an unsaturated bond have a molecular weight within the range of 1,000 to 20,000.

6. A magnetic recording material produced by the process as claimed in claim 1, wherein the ferromagnetic powder is selected from the group consisting of ferromagnetic iron oxide particles, ferromagnetic chromium dioxide particles and ferromagnetic alloy particles.

7. A magnetic recording material produced by the process as claimed in claim 6, wherein the particles have an axial ratio ranging from about 2:1 to about 20:1 and an average length in the range of about 0.2 to about 2.0 $\mu$m.

8. A magnetic recording material produced by the process as claimed in claim 1, wherein the weight ratio of the compound having an unsaturated bond to the ferromagnetic powder is within the range of 2:1 to 1:20.

9. A magnetic recording material produced by the process as claimed in claim 8, wherein the weight ratio is within the range of from 1:1 to 1:10.

10. A magnetic recording material produced by the process as claimed in claim 1, wherein the subbing layer has a thickness within the range of 0.1 to 0.5$\mu$.

11. A magnetic recording material produced by the process as claimed in claim 1, wherein the composition is coated on the subbing layer as a layer having a dry thickness of 0.5 to about 15$\mu$.

12. A magnetic recording material produced by the process as claimed in claim 1, further comprising the step of drying the coated composition with an air flow at a temperature within the range of 50° to 120° C.

13. A magnetic recording material produced by the process as claimed in claim 1, further comprising the step of orienting the ferromagnetic powder before irradiating the composition.

14. A magnetic recording material produced by a process as claimed in claim 1, further comprising the step of smoothening the composition coated on the subbing layer.

15. A magnetic recording material produced by the process as claimed in claim 14, wherein the smoothening is carried out by a calendering process wherein the roll pressure is within the range of about 25 to 100 Kg/cm$^2$ at a temperature of about 10° to 150° C.

* * * * *